(12) United States Patent
Ross

(10) Patent No.: US 7,706,574 B1
(45) Date of Patent: Apr. 27, 2010

(54) IDENTIFYING AND PROTECTING COMPOSED AND TRANSMITTED MESSAGES UTILIZING KEYSTROKE DYNAMICS

(75) Inventor: Gordon A. Ross, Bellevue, WA (US)

(73) Assignee: Admitone Security, Inc., Issaquah, WA (US)

( * ) Notice: Subject to any disclaimer, the term of this patent is extended or adjusted under 35 U.S.C. 154(b) by 1186 days.

(21) Appl. No.: 10/704,512

(22) Filed: Nov. 6, 2003
(Under 37 CFR 1.47)

(51) Int. Cl.
*G06K 9/00* (2006.01)
(52) U.S. Cl. ..................... 382/115; 382/119
(58) Field of Classification Search ............ None
See application file for complete search history.

(56) References Cited

U.S. PATENT DOCUMENTS

| | | | |
|---|---|---|---|
| 3,993,976 A | | 11/1976 | Ginsburg |
| 4,197,524 A | | 4/1980 | Salem |
| 4,455,588 A | | 6/1984 | Mochida et al. |
| 4,499,462 A | | 2/1985 | Stoesser et al. |
| 4,621,334 A | | 11/1986 | Garcia |
| 4,805,222 A | * | 2/1989 | Young et al. ............... 382/115 |
| 5,060,263 A | | 10/1991 | Bosen et al. |
| 5,161,245 A | * | 11/1992 | Fenwick .................... 382/231 |
| 5,181,238 A | | 1/1993 | Medamana et al. |
| 5,222,195 A | | 6/1993 | Alkon et al. |
| 5,276,769 A | | 1/1994 | Ueda et al. |
| 5,371,809 A | | 12/1994 | Desieno |
| 5,544,255 A | * | 8/1996 | Smithies et al. ............ 382/119 |
| 5,557,686 A | * | 9/1996 | Brown et al. ............... 382/115 |
| 5,675,497 A | | 10/1997 | Petsche et al. |
| 5,764,889 A | | 6/1998 | Ault et al. |
| 5,793,952 A | | 8/1998 | Limsico |
| 5,802,507 A | | 9/1998 | Gentric et al. |
| 5,910,989 A | | 6/1999 | Naccache |

(Continued)

FOREIGN PATENT DOCUMENTS

EP 1251468 10/2002

(Continued)

OTHER PUBLICATIONS

Jerome H. Saltzer, et al., "The Protection of Information in Computer Systems", Proceedings of the IEEE, vol. 63, No. 9, Sep. 1975 (pp. 1278-1308).

(Continued)

*Primary Examiner*—Bhavesh M Mehta
*Assistant Examiner*—Alex Liew
(74) *Attorney, Agent, or Firm*—Blakely Sokoloff Taylor & Zafman LLP

(57) ABSTRACT

A system for authenticating messages using keystroke dynamics identifying a composer of a message using diagraphs transmitted by the use of an input device. Keystrokes are gathered by modules that determine the timing factors between each keystroke and diagraph that is created by the message composer. Once sufficient keystrokes and diagraphs are monitored that allows a generation of an identifier of a unique message composition rhythm, a unique signature of the message creator is stored within the created message. This authentication method is embedded within a message. When a user tries to access or authenticate a message, the user will be verified against the authorized signature contained within the message or authorized database of readers. If a match occurs, the user will then be allowed to access the message.

27 Claims, 6 Drawing Sheets

U.S. PATENT DOCUMENTS

| | | | |
|---|---|---|---|
| 5,930,804 | A | 7/1999 | Yu et al. |
| 6,062,474 | A | 5/2000 | Kroll |
| 6,151,593 | A | 11/2000 | Cho et al. |
| 6,167,439 | A | 12/2000 | Levine et al. |
| 6,307,955 | B1 * | 10/2001 | Zank et al. ................. 382/121 |
| 6,334,121 | B1 | 12/2001 | Primeaux et al. |
| 6,405,922 | B1 * | 6/2002 | Kroll ......................... 235/379 |
| 6,421,450 | B2 * | 7/2002 | Nakano ...................... 382/100 |
| 6,513,018 | B1 | 1/2003 | Culhane |
| 6,597,775 | B2 | 7/2003 | Lawyer et al. |
| 6,839,682 | B1 | 1/2005 | Blume et al. |
| 6,850,606 | B2 | 2/2005 | Lawyer et al. |
| 6,865,566 | B2 | 3/2005 | Serrano-Morales et al. |
| 6,903,723 | B1 * | 6/2005 | Forest ........................ 345/157 |
| 6,944,604 | B1 | 9/2005 | Majoor |
| 6,965,889 | B2 | 11/2005 | Serrano-Morales et al. |
| 6,968,328 | B1 | 11/2005 | Kintzer et al. |
| 6,993,514 | B2 | 1/2006 | Majoor |
| 7,246,243 | B2 | 7/2007 | Uchida |
| 2002/0171603 | A1 | 11/2002 | Chen et al. |
| 2004/0005995 | A1 | 1/2004 | Edelson |
| 2004/0034788 | A1 | 2/2004 | Ross |
| 2004/0103296 | A1 | 5/2004 | Harp et al. |
| 2004/0162999 | A1 | 8/2004 | Schreiber et al. |
| 2004/0187037 | A1 * | 9/2004 | Checco ...................... 713/202 |
| 2005/0008148 | A1 | 1/2005 | Jacobson |
| 2005/0149463 | A1 | 7/2005 | Bolt et al. |
| 2007/0245151 | A1 | 10/2007 | Phoha et al. |

FOREIGN PATENT DOCUMENTS

| | | |
|---|---|---|
| JP | 11253426 | 9/1999 |
| JP | 11306351 | 11/1999 |

OTHER PUBLICATIONS

R. Stockton Gaines, et al., "Authentication By Keystroke Timing: Some Preliminary Results", Prepared Under a Grant From the National Science Foundation, R-2526-NSF, May 1980, Published by Rand Corporation.

John Sedgwick, "The Body Code Machines", These New Computerized Devices Can Recognize You Anywhere, This World, Jan. 9, 1983 (pp. 9-10).

BioPassword Technical Report, BioPassword Keystroke Dynamics, Oct. 2001, pp. 1-9.

Bleha, S., et al., "Computer-Access Security Systems Using Keystroke Dynamics," IEEE Transactions on Pattern Analysis and Machine Intelligence (Dec. 1990), 12(12): 1217-1222.

Brown, M., et al., "User Identification via Keystroke Characteristics of Typed Names Using Neural Networks," Int. Journal of Man-Machine Studies (1993) 39(6): 99-1014.

Cotton, Ira W. et al, "Approaches to Controlling Personal Access to Computer Terminals," *Proceeding Computer Networks: Treads & Appos.*, 1975.

Fielding, R., et al., "Hypertext Transfer Protocol—HTTP 1.1", RFC2616 dated Jun. 1999; 177 pages.

"Guidelines on Evaluation of Techniques for Automated Personal ID," U.S. Dept. of Comm./NBS, FIPS, PUB 48, Apr. 1977.

Jain, A.K., et al., "Artificial Neural Networks: A Tutorial," Computer, (Mar. 1996) 29(3): 31-44.

"Keystroke Dynamics Authentication of Computer Terminal Users," Bioaccess System 2000, 2000A, 2001, 2011, and OEM, Jun. 1984.

Kullback, Solomon, *Information Theory & Statistics*, John Wiley & Sons Inc., pp. 3383, 1959.

Legett, J., et al., "Verifying identity via keystroke characteristics," Int. Journal of Man-Machine Studies (1988) 28(1): 67-76.

Lippmann, R.P., et al., "An Introduction to Computing with Neural Nets," IEEE ASSP Magazine, (Apr. 1987) 4(2): 4-22.

Monrose, F., et al., "Authentication via Keystroke Dynamics," Proc. of the ACM Workshop, ACM Conference on Computer Communications Security (1997), pp. 48-56.

Monrose, F., et al., "Keystroke dynamics as a biometric for authentication," Future Generation Computer Systems, 16(2000): 359-359, Mar. 1999.

Rennick, R.J. et al., "Mufti-A Multi-Function ID System," *WESCON Tech. Papers*, 1975.

Riganati, John P., "An Overview of Electronic ID Systems," *WESCON Tech. Papers*, 1975.

Robinson, J.A., et al., "Computer User Verification Using Login String Keystroke Dynamics," IEEE Transactions on Systems, Man and Cybernetics—Part A: Systems and Humans, (Mar. 1998) vol. 28, No. 2, pp. 236-241.

Sheng, Y., et al., "A parallel decision tree-based method for user authentication based on keystroke patterns," IEEE Transactions on Systems, Man and Cybernetics—Part B: Cybernetics, (Aug. 2005) 35(4): 836-833.

David Umphress and Glen Williams; Identity verification through keyboard characteristics; Department of Computer Science, Texas A & M University; Academic Press Inc. (London) Limited, 1985, pp. 263-273.

BioPassword, Inc., Office Action in U.S. Appl. No. 11/394,607 dated Feb. 4, 2008 (received Feb. 8, 2008), 6 pages.

BioPassword, "Technical Report. BioPassword Keystroke Dynamics", http://web.archive.org/web/20040807231; http://www.biopassword.com/home/technology/BP%204.5%20Technical%20Paper.pdf, (Oct. 18, 2001).

Ilonen, J, "Keystroke dynamics", Advanced topics in information processing 1—lectures, Lappeenranta University of Technology, Department of Information Technology, (2003), 1-15.

Monrose, F, et al., "Keystroke dynamics as a biometric for authentication", Future Generation Computer Systems, vol. 16, (2000), 351-359.

Peacock, A, et al., "Typing patterns: a key to user identification", IEEE Computer Society, vol. 2, No. 5, (Sep. 2004), 40-47.

Penn State Research Foundation, Inc., EP Extended Search Report dated Oct. 1, 2008 for EP Application No. 05858188.5.

* cited by examiner

IDENTIFYING AND PROTECTING COMPOSED AND TRANSMITTED MESSAGES UTILIZING KEYSTROKE DYNAMICS

FIELD

Verifying message authenticity.

BACKGROUND

Authentication systems protect resources, such as documents and data, and accurately identify the creator of the resource. For example, a message (i.e., a written instrument or electronic document) created by an individual can be marked by a hand written signature, sealed by a physical seal, or protected by a password or a personal identification number (PIN) in order to identify the author of the message or control access to its contents. In some electronic or computer systems, the signature, PIN or password of the message creator is stored in a central memory or in storage media that is part of the computer system. When a user desires to read the protected message, the user enters the appropriate signature, password or PIN using an input device. The computer system compares the signature, password or PIN that is entered using the input device with the stored signature, password or PIN associated with the message to be accessed and determines whether to allow the message to be displayed or accessed.

Message creation is accomplished through the use of message creating devices such as word processing applications, email applications or similar software. Communication of messages may be done over a network such as the Internet using standard telecommunications infrastructure. A standard Qwerty or Dvorak type of keyboard may be used in order to input data or collect keystrokes.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
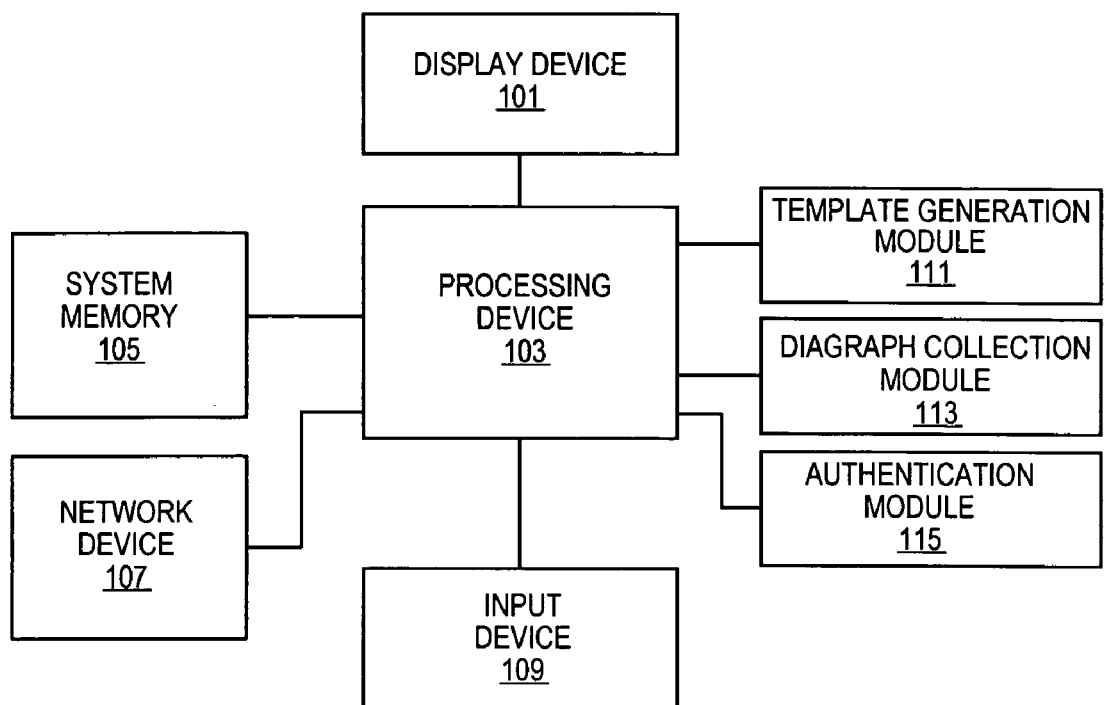
FIG. 1 is a block diagram of a system for authenticating messages.

FIG. 1 is a block diagram for an authentication system. The authentication system may include display device 101 for showing text and graphical information to a user. Display device 101 is connected to processing device 103. Display device 101 is capable of displaying alpha numeric character sets, diagrams or graphics. In one embodiment, display system may be a Flat Panel Liquid Crystal Display (LCD) or a Cathode Ray Tube (CRT) type of display.

In one embodiment, processing device 103 is a general purpose processor such as a central processing unit (CPU). In another embodiment, processing device 103 may be a dedicated device or set of devices such as an application specific integrated circuit (ASIC) for text messaging, text processing, cellular communications processing or similar processing. Processing device 103 may be connected to system memory 105 that stores data and instructions used by processing device 103.

Input device 109 is connected to processing device 103 to allow a user to provide data to processing device 103. In one embodiment, input device 109 may be a keyboard, key pad, touch pad, pointer device (e.g., a mouse, trackball or similar device), visual input device or similar input device. Input device 109 is used for creating diagraphs or alpha-numeric characters that are input to processing device 103. Input device 109 is also used to request the reading and displaying of a message or similar resource. The authentication system may be used with existing or future input devices that are able to compose a message using alpha-numeric character sets and diagraphs.

In one embodiment, template generation module 111, diagraph collection module 113 and authentication module 115 are each in communication with processing device 103. These modules may be ASICs, code to be run by processing device 103 that is stored in a storage medium such as a fixed disk, compact disk or similar medium, applications running on a remote system or combinations thereof.

In one embodiment, diagraph collection module 113 works in conjunction with processing device 103 to collect incoming data from input device 109. Diagraph collection module 113 provides a collection of keystroke dynamic diagraphs of the message creator from each of a plurality of input sources of the message creator from a minimum of one input device 109 that communicates with processing device 103. This data is used by template generation module 111 to generate a template of input device use characteristics. The template can be used by authentication module 115 to compare signature data in a resource against a template or set of templates. Authentication module 115 works in coordination with processing device 103 to control access to resources requested by a user. The system may also include network device 107 for transmitting and receiving data and instructions over a network or communications system.

Authentication involves determining which individuals are authorized to access protected resources such as messages. In one embodiment, varying levels of accuracy in authentication may be enforced. If an authorization level of a user falls within the defined multi-level range corresponding to an acceptable false acceptance rate (FAR) then the user is given access to a resource. Any individual who does not meet the required level is denied access to the resource. In one embodiment, the message creator or system manager may determine the threshold required to access the message. The message may be set to a range of threshold levels depending on the level of security desired.

A message is used herein as an exemplary resource to be protected by the authentication system. Other resources such as data files, applications and similar information may similarly be protected. A message is a communication in writing, in speech, or by signals. A message creator may be an individual with sole authority for message creation and access to the message. Message access and creation authority may also be granted to members of a predetermined group of authorized message creators and users.

Messages to be protected are associated with signature data. Signature data uniquely identifies the creator of the message. Signature data is based on timing patterns in the manner in which a user inputs data, such as timing patterns in the keystrokes of a user typing a message. Signature data may be collected during the creation of a message to be protected and be embedded into the message. Data collected that uniquely identifies a user may also be collected to create an authentication template. This identifying data is aggregated for each user to allow an authentication system to identify a message created by that user. The system authenticates messages based on the comparison of signatures and authentication templates, which are each derived from diagraph timings and similar input timings. A diagraph is a common sequence of letters such as "th," "ch" or similar patterns that occur during typing or data input.

In one embodiment, messages may be authenticated when a user seeks to access the message. During the message authentication process the authentication templates are statistically compared to signature data of the message. This process is especially suited for protecting the confidentiality of a message and at the same time ensuring that a message is authentic (i.e., the origin of the message is verified). The authentication system ensures a message is authentic and readable by the creator and other authorized individuals. If the message is intercepted, an unauthorized person is denied access by the system preventing the viewing or use of its contents.

FIGS. 2A-2E display some of the input devices and systems that can be used to generate protected messages and to authenticate messages over a variety of communication mediums.

Figures 2A, 2B:
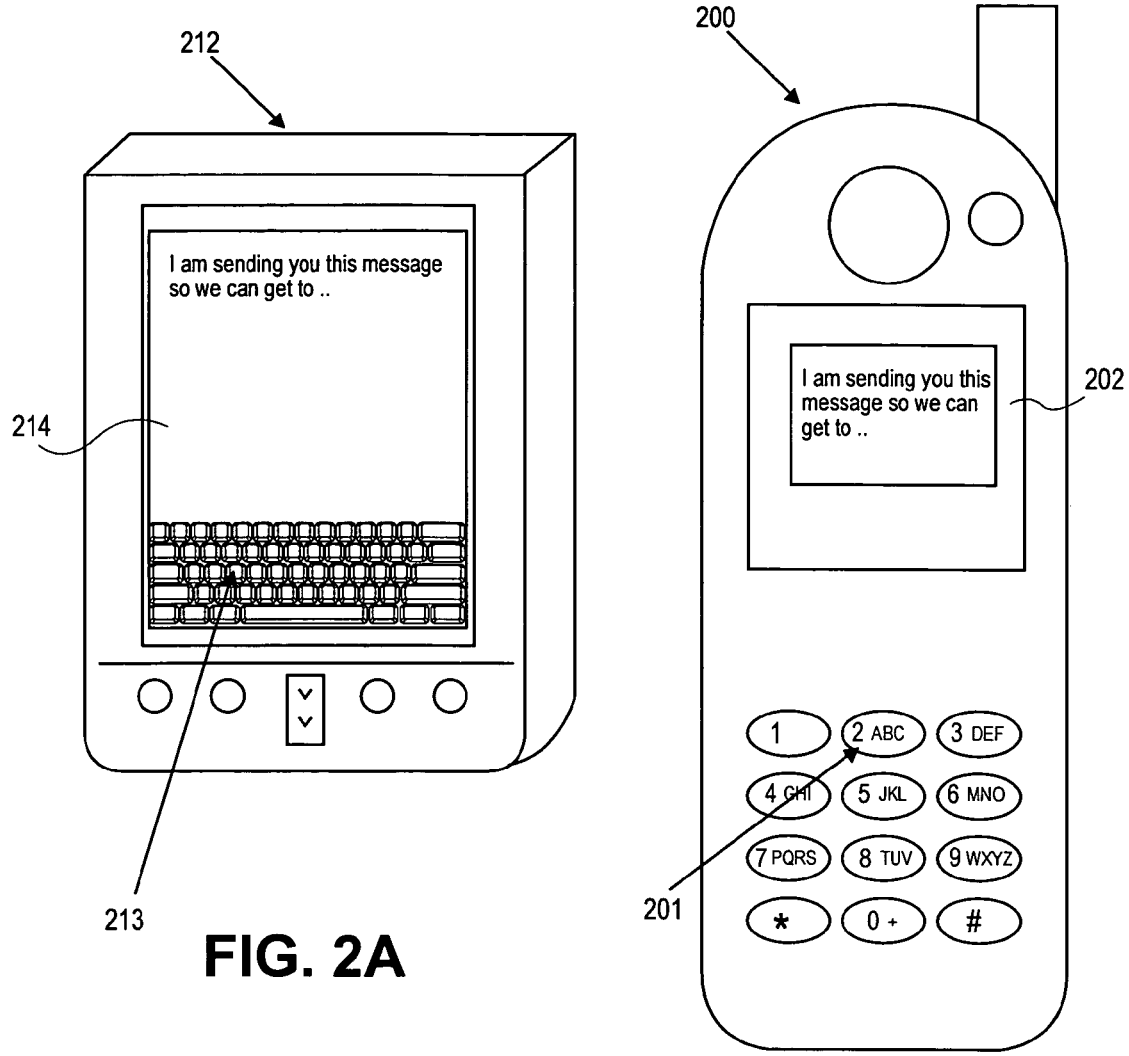
FIG. 2a is an illustration of a personal digital assistant capable of authenticating messages.
FIG. 2b is an illustration of a cellular phone capable of authenticating messages.

FIG. 2a is an illustration of an exemplary embodiment utilizing a personal digital assistant (PDA). PDA 212 includes display 214 and touchpad 213 for receiving input from a user. Referring in conjunction to the authentication system of FIG. 1, PDA 212 may include a central processing unit and software modules for diagraph collection 115, authentication 115 and template generation 111. In another embodiment, diagraph collection module 113, authentication module 115 and template generation module 111 are implemented as ASICs or similar devices.

A PDA may be used for creating, storing and forwarding alpha-numeric messages and information over communication networks, including networks, such as wireless networks, and via infra-red signaling.

A PDA's touchpad 213 may include a "virtual" keyboard that is used for composing and sending messages using a "stylus", or pen, to "tap" the various keyboard characters that are on the screen. Authentication protocols may be established by using the virtual keyboard that is on the touch screen of the PDA.

FIG. 2b is an illustration of an exemplary embodiment utilizing a cellular or wireless phone 200. Cellular phone 200 includes display 202 for viewing messages and key pad 201 that allows a user to compose messages. Referring in conjunction to the authentication system of FIG. 1, cellular phone 200 may include processing device 103, diagraph collection module 113, template generation module 111 and authentication module 115. Buttons of keypad 201 may be used for composing and sending messages. Cellular phone 200 is capable of composing, sending and receiving alpha-numeric messages over wireless communication networks.

Figures 2C, 2D:
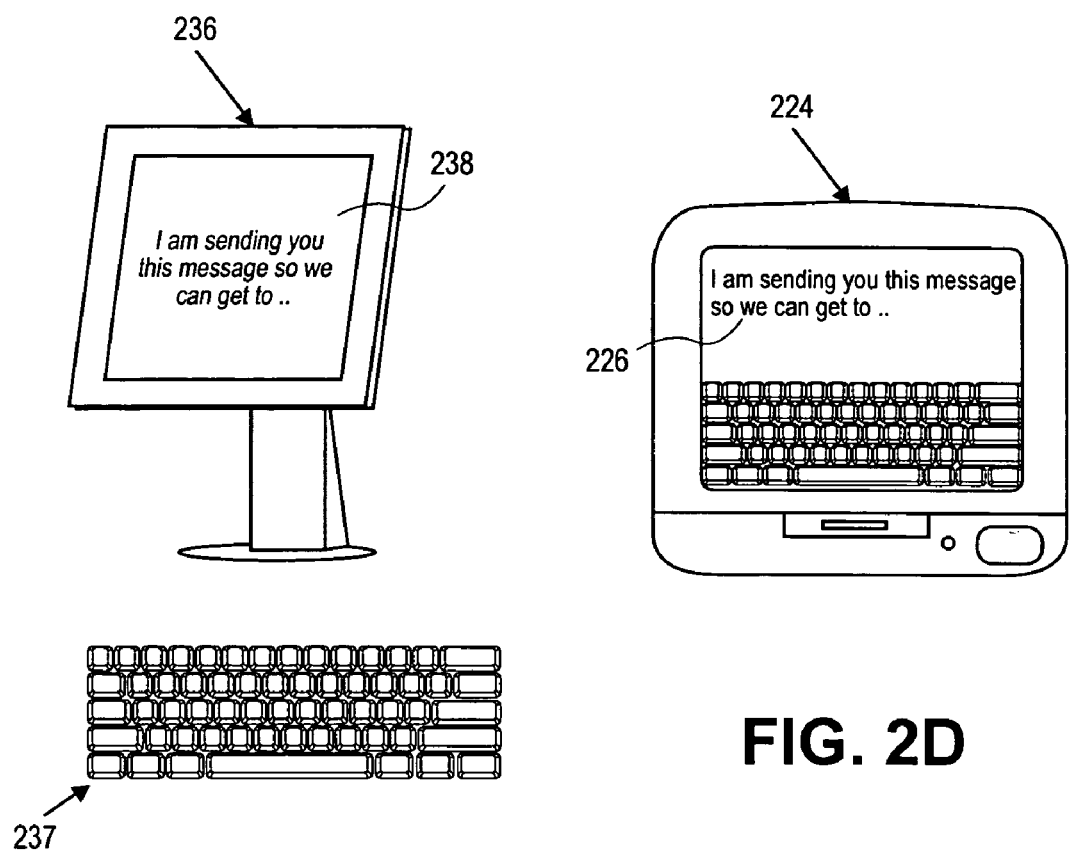
FIG. 2c is an illustration of computer system capable of authenticating messages.
FIG. 2d is an illustration of a touch pad system capable of authenticating messages.

FIG. 2c is an illustration of an exemplary embodiment, utilizing computer system 236 including a display device 238 and input device 237. Referring in conjunction to the authentication system of FIG. 1, computer system 236 includes a central processing unit and software modules for diagraph collection 113, authentication 115 and template generation 111.

In one embodiment, computer system 236 may be a stand-alone, host or network computer system with a flat panel monitor cathode ray tube (CRT) or similar display device 238. In one embodiment, computer system 236 includes a keyboard 237 for inputting alpha-numeric data into a computer system 236. Keyboard 237 may be a wired or a wireless type of keyboard.

FIG. 2d is an illustration of an exemplary embodiment, utilizing touchpad system 224 including combined display touchpad 216 for receiving input and displaying text and graphics. Referring in conjunction to the authentication system of FIG. 1, touchpad system 224 may include a central processing unit and software modules for diagraph collection 113, authentication 115 and template generation 111. In another embodiment, diagraph collection, authentication and template generation modules are implemented as ASICs or similar devices.

In one embodiment, touchpad device 224 includes a keyboard that is part of the touchpad display 226. This keyboard is used for typing data by touching the appropriate characters that appear on the screen.

Figure 2E:
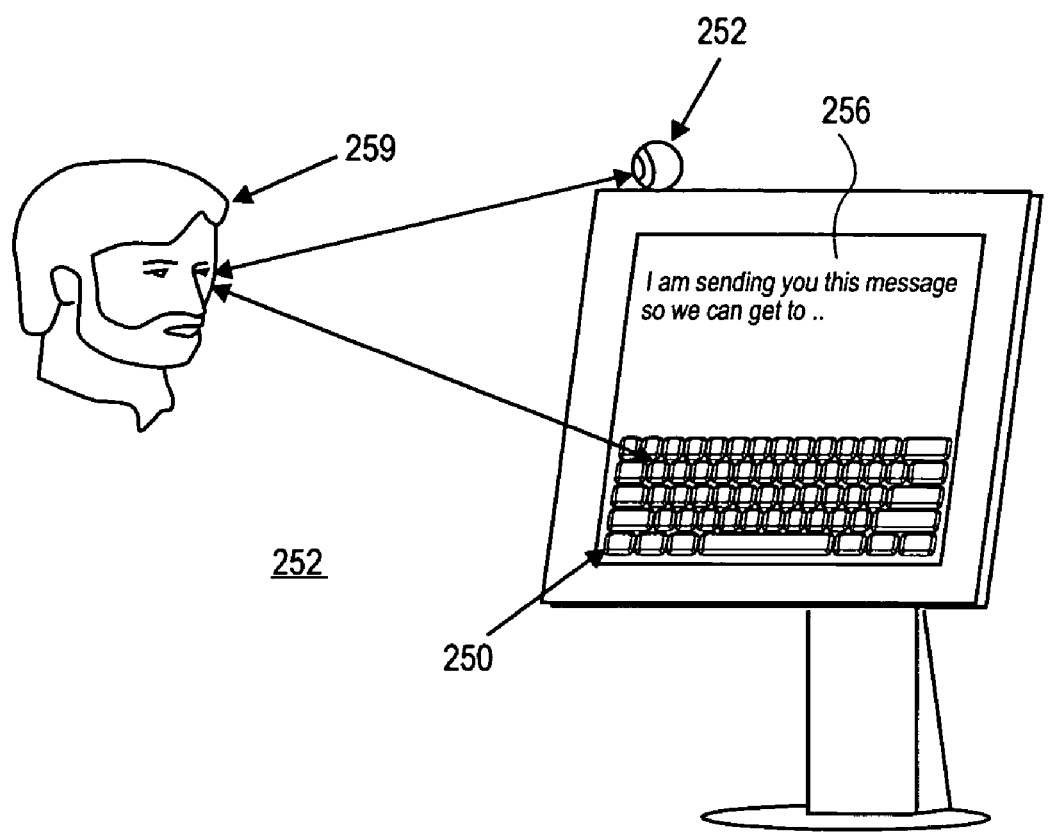
FIG. 2e is an illustration of a visual input system capable of authenticating messages.

FIG. 2e is an illustration of a visual input system 252. Visual input system 252 includes a camera 258 or similar optical device for tracking the movements of user 259. In one embodiment, camera 258 tracks the eye movements of user 259 in relation to a display 256 showing a set of input options 250. Referring in conjunction to the authentication system of FIG. 1, visual input system 252 is coupled to a system including a central processing unit and software modules for diagraph collection 113, authentication 115 and template generation 111. In another embodiment, diagraph collection module 113, authentication module 115 and template generation module 111 are implemented as ASICS or similar devices.

Visual input system 252 tracks what alpha-numeric key the individual is looking at on the keyboard which is part of the visual display attached to a computer system and generates an appropriate signal to be input into the computer system. Camera 258 works in conjunction with computer software to recognize and record the characters that the subject human being is looking at on the touch screen keyboard.

Figure 3:
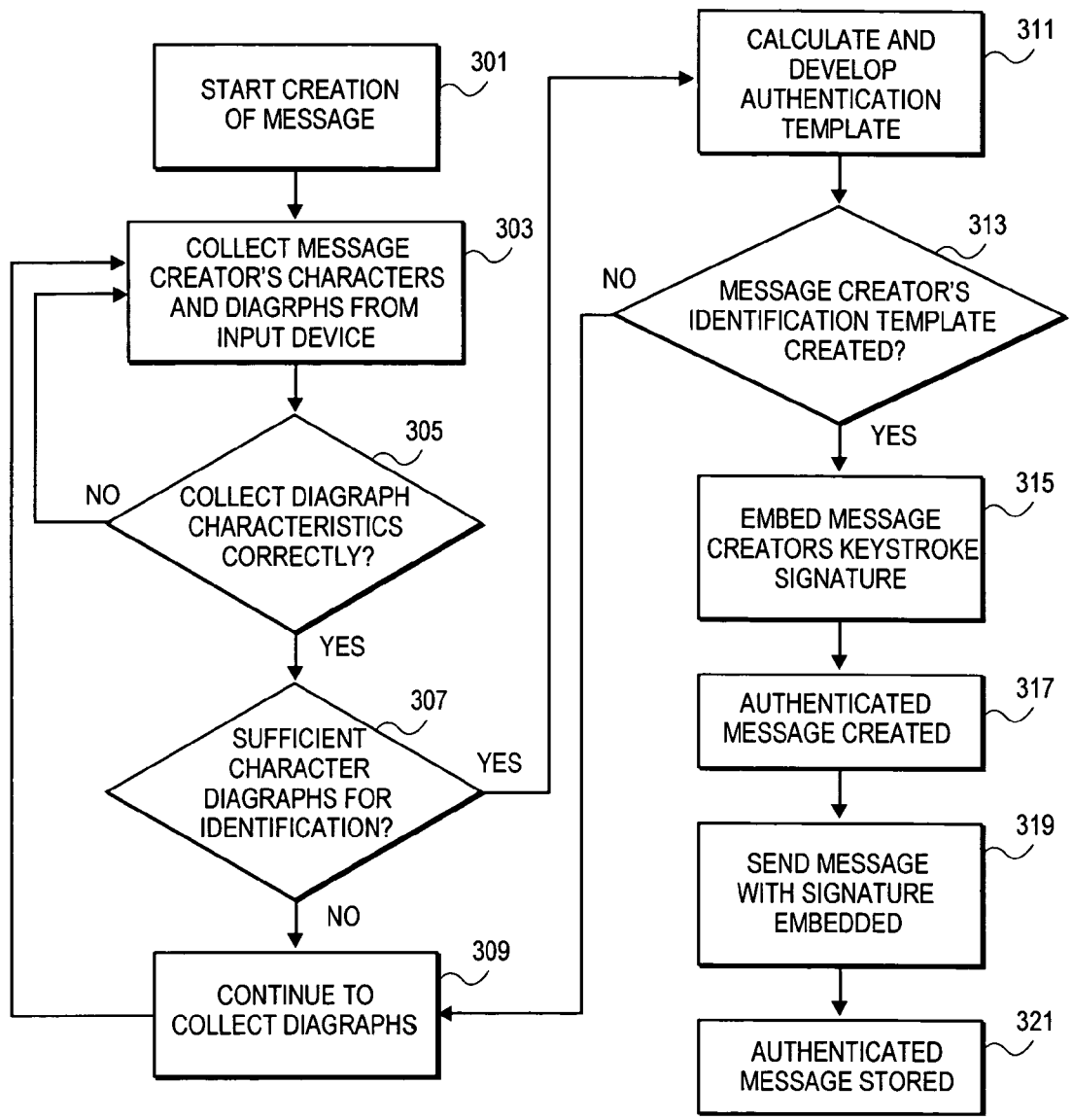
FIG. 3 is a flowchart of a template generation and diagraph collection process.

FIG. 3 is a flow chart illustrating the process of generating an authentication template and message signature. In one embodiment, this process involves developing biometric keystroke dynamic message identification data. A biometric keystroke dynamic message identification data is a uniquely identifying set of values derived from the timing of input patterns of a user.

The authentication system is described with reference to FIG. 1 and the accompanying text is referenced here. The process is started by a user when creating the message that is to be protected by the authentication system (block 301). For example, a user may create an email message to be sent to another user. During the creation of the message, diagraph collecting module 113 collects the characters and various diagraphs input by the creator. The message creator's characters and diagraphs are gathered by the system through input devices 109 including keyboards, touch pads, touch-screen pads, pointer devices or visual systems (block 303). For example, while typing the email message a user's keystrokes are collected. Diagraph collection module 113 in conjunction with processor 103 accomplish the collection of this data.

Diagraph collection module 113 may be a dedicated circuit or a software program. Diagraph collection module 113 captures the character stream that is generated when the message is being input.

Diagraph collection module 113 captures a string of characters consisting of common key combinations known as diagraphs. These diagraphs, that are part of the overall message created from an input device, are captured along with the time between the appearance of these diagraphs. Additional data such as flight (times between each character and diagraph created) and dwell (length of time each character was held) times are also tracked. Examples of these diagraphs are the common combinations of the characters such as "th", "on", "in", "ou," "me," etc. These diagraphs can vary in length from 2 to n characters, where n is any number.

Pressure measurements from an input device 109 may be monitored via the measurement of the electronic pulses generated by the manner in which a person pushes the keys or by the way the person touches the screen on a virtual keyboard or similar input device. The use of hardware load cells or other pressure sensing devices is not needed to determine how much pressure was used when striking the key. It may be measured mathematically by measuring the flight and dwell times. The flight time is the time between each key press. The dwell time is how long the key was pressed. Pressure can be "virtually" measured by using the dwell time. If the key has too much pressure applied to it, a long dwell time results as well as the potential for repeating the same character over and over as the key continues to generate a signal until the pressure is removed. The result of more pressure being asserted on a key will result in a longer dwell time.

Diagraph collection module 113 determines if the characters and diagraphs are being collected correctly (block 305). If the module is not collecting the characters and diagraphs correctly collection is continued until diagraphs and related data are properly collected (block 303). For example, the diagraph collection module determines whether a user typing the email messages has typed a sufficient number of characters or a sufficient number of diagraphs in the message to uniquely identify the user. Collection failure may occur when an input device (e.g., keyboard, keypad or similar device) ceases to function due to hardware failure. Collection failure may also occur when a user ceases to input data or decides to terminate the application collecting the data. If insufficient characters or diagraphs are collected, an authorization signature may not be created. Collection failure may also occur in the event of power outages or brown out. The computer system may have insufficient processing resources to collect input data and fail to accumulate the appropriate data in order to develop a proper signature.

If the characters and diagraphs are being collected correctly then diagraph collection module 113 determines if sufficient data has been collected to identify the message creator (block 307). As these items are collected by the collection module 113, diagraph collection module 113 does a mathematical and statistical analysis to determine whether sufficient data has been collected that will allow a unique message authentication identifier to be determined.

The number of characters or diagraphs that are required to be collected is dependent on the typing characteristics of the user. In one embodiment, the minimum number of characters required is approximately 15 samples of 8 characters of an uninterrupted typing pattern (i.e., a minimum of 120 characters or diagraphs). In another embodiment, fewer character and diagraph samples may be used dependent on the level of accuracy desired in the authentication process.

If sufficient data has been collected to identify the creator, then diagraph collection module 113 passes the data onto the template generation module 111 to develop the message creator's authentication template (block 311). If the collection module 113 has collected an insufficient amount of characters and diagraphs to properly identify a user then it continues to collect characters and diagraphs from the input devices (block 309).

Template generation module 111 processes the collected data to determine unique timing characteristics associated with the characters and diagraphs generated by the message creator in order to generate the message creator's authorization template and signature value as discussed above (block 311). For example, the collected data of a user typing an email message is used to calculate a unique identifying value for that user. In one embodiment, template generation module 111 in conjunction with diagraph collection module 113 register each keystroke dynamically produced diagraph collected from the message sample. The diagraph is stored in a template associated with the previously collected diagraph data of the authorized message creator for use in verifying or identifying the message creator. The template is a numeric value based on statistical analysis. In one embodiment, the template may be encrypted and stored in a data file as encrypted data.

In one embodiment, the calculations include determining the template interval mean (TIM), which is shown by the following formula:

$$TIM = \frac{(n-1)*(templatemean) + (samplemean)}{n}$$

where n is the number of keys used.

In one embodiment, the (TIM) is one of a set of calculations that are used to develop a template. Other calculations include determining the Euclidean Distance for the flight time data (the time between key presses and diagraph collections) and the dwell time data (the time measurement of the duration of a key press and/or time between the creation of diagraphs).

In one embodiment, authentication makes use of vectors and the calculation of the Euclidean Distance (ED) between the various points. The Euclidean Distance for measuring the distance between vectors is a way of obtaining similarity between signatures and may be calculated by the following formula:

$$ED(Y, Z) = \sqrt{\sum_{k=1}^{m} (Y_{(k)} - Z_{(k)})^2}$$

where $Y = \{Y_1; Y_2; Y_3; \ldots Y_k\}$ and $Z = \{Z_1; Z_2; Z_3 \ldots Z_k\}$ are the two representing a first set of features between the pattern vectors (e.g. diagraphs). The variable m is the number of diagraphs or similar data points collected.

The Euclidean distance is a mathematical calculation to determine the proximity of two vectors. The calculation involves for each measurement (e.g., diagraph related data collected including flight and dwell times and similar data) subtracting the sample measurement from the signature average for the measurement and dividing by the signature's Euclidean distance for the measurement. This result is squared. These results are added together and the square root is obtained. In one embodiment, this intermediate value is multiplied by 10 and divided by the total number of measurements. The final result is referred to as the Euclidean Distance.

For example, Y may represent the key activation or 'key down' data and Z may represent the key release or 'key up' data. The Euclidean distance calculated over this set of data results in a unique identifier for an individual when sufficient data has been collected. This formula may be extended for additional extracted feature processing continuous from k=1 to m where m=number of patterns. In one embodiment, the Euclidean distance value may be used to produces a number that may be used for defining a threshold value for the authorization level by the message creator.

The vectors and data utilized by the identification algorithms such as the Euclidean distance calculation includes dwell and flight times for diagraphs and similar input data along with features extracted from histograms that are generated from the diagraphs. In one embodiment, these histograms include "all flights" where the "average" and "median" of all flight times are recorded. Other histograms include the "all dwell times" where the "average" and "median" dwell times are recorded. Additional measurements of placements of the keys are also measured.

In one embodiment, the final signature is created from the calculated Euclidean distance value, the template interval mean value (TIM) or similar algorithms for measuring the proximity of input data with previously collected data to generate a unique identifying value. In another embodiment, these values are further adjusted by a scoring function.

In one embodiment, after features are extracted from the data a 'score' is calculated for the signature based on the information from the histograms that were created from the diagraphs. In one embodiment, the scoring is calculated:

$$Score=[templatediagraphs-samplediagraphs]*Wtg$$

where Wtg is a weighting factor. The weighting factor may be determined by techniques discussed in "Authentication by Keystroke Timing:Some Preliminary Results," Gaines, R. et al, Rand Corporation (1980). The final score may be utilized for authentication by being compared with several threshold values to determine whether the authentication is correct. Depending on the comparison value returned, the message may be judged authentic or unauthentic. The score also determines who is authorized to open and view or read the message based on threshold values for individual and group authentication.

Template generation module 111 verifies that the message creator's identification template has been created (block 313). If the template has not been successfully created the template generation module 111 returns control to the collection module 113 to continue to gather sufficient characters and diagraphs until a template is successfully created.

In one embodiment, the characteristics of the diagraphs and character information generated by the message creator are recorded with previously stored diagraph template information. If the message creator's authentication template has been successfully created, the template generation module incorporates it into the overall message that has been created as a signature for the user (block 315). For example, the signature value may be stored as a header value in the format of the email composed by the user. In one embodiment, the message is also encrypted to prevent circumvention of the authentication system. The message is complete after the signature is embedded if no encryption is used (block 317).

In one embodiment, the signature data is embedded as part of the message header stream and becomes part of the over all message. In another embodiment, the signature may be a part of the body or tail of a message. This signature is part of the over all message and can be transmitted as part of the message or separately if the message creator chooses. In another embodiment, the signature may be directly incorporated into the formatting routines used to create the message.

In one embodiment, the completed message with the message creator's authentication template (i.e., signature) embedded within it may be transmitted to another device. The protected message may be sent or transferred over any communication medium including networks such as the Internet (block 319). For example, an email composed by a user with an embedded signature may be sent over a network to an intended recipient. The protected message may also be stored locally or remotely (block 321).

Figure 4:
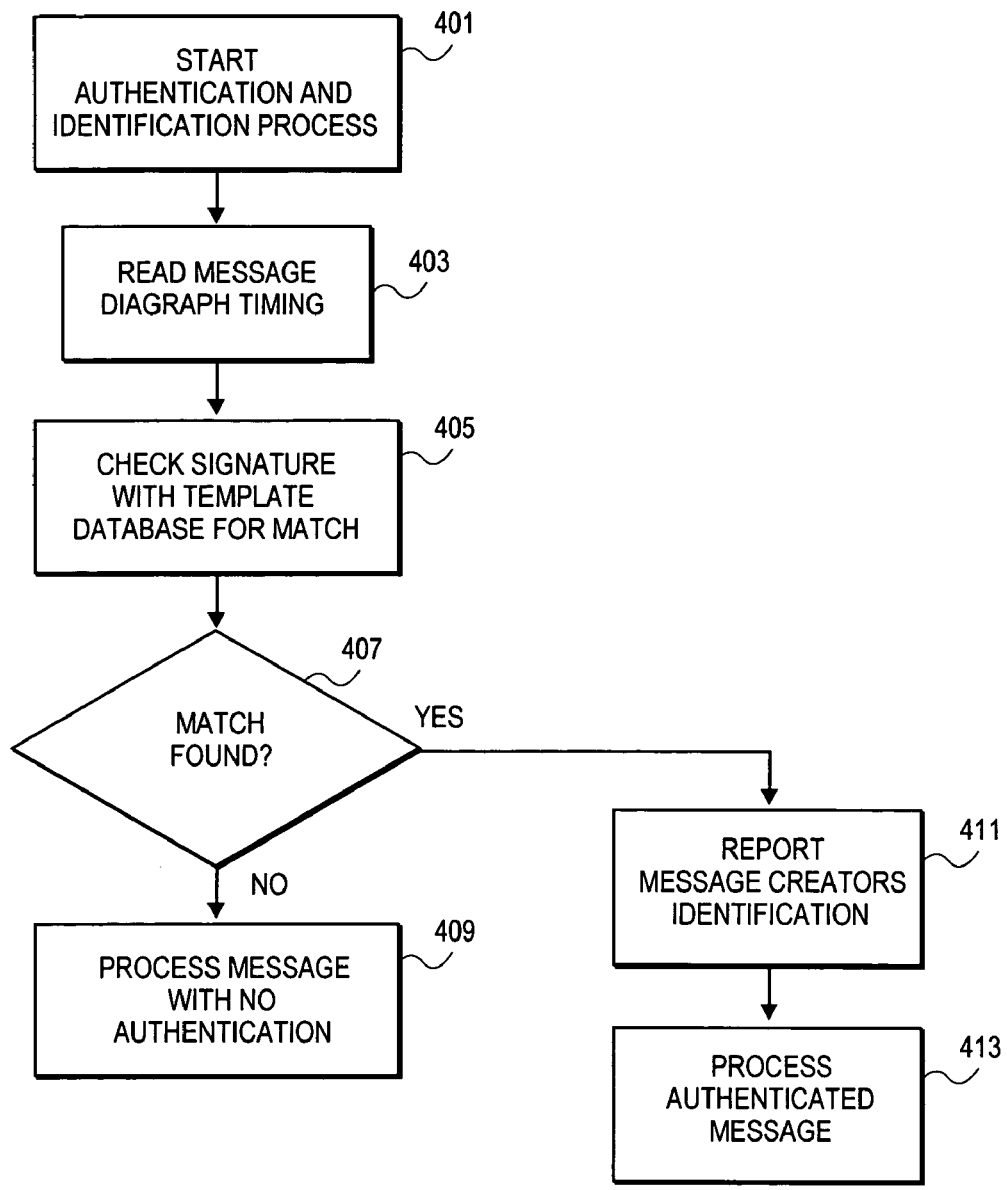
FIG. 4 is a flowchart of an authorization process.

FIG. 4 is a flow chart illustrating the process of authenticating a message. Authentication module 115 authenticates a signature protected message and identifies the creator of the message. The authentication process relies on signature data embedded in the message and authentication templates stored in a database accessible to the authentication module 115. Signature data and authentication template data are calculated during the creation of the message while the creator is composing the message.

The authentication and identification process is initiated by a request to access a message or by a similar event (block 401). For example, a recipient of an email with an embedded signature may open the email. Authentication module 115 reads the signature data that was created by the template generation module 111 and embedded in the message (block 403). Authentication module 115 searches the authentication templates that are stored in a template database with the embedded signature database and compares them to determine if they match (block 405). A single user may have multiple signatures stored each associated with a type of input device or similar categorization. The database comparison may search a specific category of signatures. For example, the database may be searched when an email with an embedded signature is opened in categories or devices that may generate an email such as a signature generated by a keyboard.

In one embodiment, authentication module 115 determines authenticity and identity of a message creator by comparing the signature value embedded in a message with the values in a database identifying users of a system. This system is premised on the recognized differences in how one individual (individual X) will activate keys on a keyboard, keypad, touch screen or other alpha-numeric input device, from another individual (individual Y). In another embodiment, authentication module 115 analyzes sets of stored diagraph data to compare them with the authentication signature in the message.

When a message is received or access requested to the message the associated signature data is compared to that which is in the authentication template database for a match with a template associated with the message creator or authorized reader of the message. If a match is made within the associated tolerance levels that the creator or system manager has defined, then the message will be deemed authentic. If a match is not made then the message is deemed unauthentic and handled accordingly. This may mean the message is inoperable or inaccessible.

In one embodiment, to determine the authenticity of the message the signature data must be retrieved from the message. The signature may be stored within the header information for the message or in the body of the message itself. During authentication, the signature value is matched against a known signature or set of signatures. If the quantified difference between the signature value and a stored template or signature value falls within an allocated statistical curve then the message is either accepted as valid or is identified as potentially invalid, or unauthenticated.

In one embodiment, if a match is found or threshold met for the embedded message signature, then data access may be allowed to the message by the requesting user (block 407). Authentication module 115 may also report the identification of the creator and process the message as authentic (block 411). If no match is found then the message is processed as unauthenticated (block 409). This may result in blocked access to the message.

In one embodiment, other applications may then display the message and indicate the message is authentic and identify the message creator's credentials (block 413). Authentication module 115 may also identify the individual attempting to access the message to determine if the individual is authorized to access the message by accessing a database of authorized users. In another embodiment, signature data may be tracked to monitor activities of users including users with unknown identity.

In one embodiment, signature data or authentication template data may be converted to threshold score data during message creation or prior to a message access request. Scores and threshold values may be stored as a part of a signature or authentication template. In another embodiment, statistical data collected for a user may be stored and utilized to generate templates and signature values.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method performed by a processing device comprising:
    tracking a first time interval that a computer system input source is active;
    tracking a second time interval between input source activation; and
    storing in the computer system at least one biometric keystroke user identification template derived from the first time interval and the second time interval, wherein the first time interval and second time interval: (1) are associated with a first diagraph defined by a common sequence of letters that occur during typing of separate letters of the first diagraph and (2) depend on a typing characteristic of a user, wherein the first time interval is an interval that a first key of the first diagraph is active, the second time interval is an interval between input source deactivation of the first key and input source activation of a second key of the first diagraph; and further comprising tracking a third time interval that the computer input source is active for the second key of the first diagraph, wherein deriving the user identification template comprises calculating a template interval mean using the first, second, and third time interval to measure the proximity of the first, second, and third time interval with a plurality of previously tracked first, second, and third time intervals; wherein the computer system input source is an alpha-numeric keyboard.

2. The method of claim 1, wherein the at least one template includes a numeric value based on statistically analysis.

3. The method of claim 1, further comprising:
    associating the first time interval and the second time interval with a resource.

4. The method of claim 1, wherein the input source is one of a keyboard, touch pad, and keypad.

5. The method of claim 1, wherein the first time interval is an interval during which a first displayed character is typed using the input device, and wherein the second time interval is an interval between typing the first displayed character and typing a second displayed character using the input device.

6. The method of claim 2, further comprising generating the at least one template comprising calculating a template interval mean (TIM) or calculating a Euclidian Distance using the first set of input timing data for the first diagraph.

7. A method performed by a processing device comprising:
    recording a set of signals from an alpha-numeric keyboard;
    determining dwell times and flight times for the set of signals;
    embedding the dwell times and flight times as a first template in a resource, wherein the dwell times and flight times: (1) are associated with a first diagraph defined by a common sequence of letters that occur during typing of separate letters of the first diagraph and (2) depend on a typing characteristic of a user, wherein the dwell times and flight times include: a first time interval that a first key of the first diagraph is active, a second time interval between deactivation of the first key and activation of a second key of the first diagraph, and a third time interval that the second key of the first diagraph is active, wherein deriving the user identification template comprises calculating a template interval mean using the first, second, and third time interval to measure the proximity of the first, second, and third time interval with a plurality of previously tracked first, second, and third time intervals; and
    allowing access to the resource if the first template approximates a second template.

8. The method of claim 7, further comprising:
    computing a value based on the first template; and
    comparing the value to a threshold value.

9. The method of claim 7, further comprising:
    searching a database for the second template, the second template approximating the first template.

10. A system comprising:
    a display device;
    an input device,
    a processing module coupled to the input device and the display device to generate an authentication template based on dwell times and flight times received from an input device, wherein the dwell times and flight times: (1) are associated with a first diagraph defined by a common sequence of letters that occur during typing of separate letters of the first diagraph and (2) depend on a typing characteristic of a user, wherein the dwell times and flight times include a first time interval that a first key of the first diagraph is active, a second time interval between deactivation of the first key and activation of a second key of the first diagraph, and a third time interval that the second key of the first diagraph is active; wherein the input device is an alpha-numeric keyboard wherein deriving the user identification template comprises calculating a template interval mean using the first, second, and third time interval to measure the proximity of the first, second, and third time interval with a plurality of previously tracked first, second and third time intervals; and
    a storage device to store the authentication template.

11. The system of claim 10, further comprising:
a network device coupled to the processing device to transmit one of the authentication template and an input from the input device.

12. The system of claim 10, wherein the input device is one of a keyboard, touch pad, keypad and visual input device.

13. The system of claim 12, wherein the processing module to compare the authentication template with a signature embedded in a resource; and
wherein the processing module grants access to the resource if the authentication template and embedded template each identify an identical creator.

14. A computer-readable medium having instructions stored in the medium, which when executed by a machine cause the machine to perform operations comprising:
storing a first set of diagraph characteristics data for a user, wherein the diagraph characteristics data comprises data: (1) defined by a common sequence of letters that occur during typing of separate letters of the first diagraph on an alpha-numeric keyboard and (2) that depend on a typing characteristic of a user, wherein the diagraph characteristics data comprises a first time interval that a first key of the first diagraph is active, a second time interval between deactivation of the first key and activation of a second key of the first diagraph, and a third time interval that a second key of the first diagraph is active, wherein deriving the user identification template comprises calculating a template interval mean using the first, second, and third time interval to measure the proximity of the first, second, and third time interval with a plurality of previously tracked first, second, and third time intervals; and
generating an authentication template from the first set of diagraph characteristics data specific to the user;
storing the template in a memory.

15. The computer-readable medium of claim 14, which when executed by the machine further causes the machine to perform operations comprising:
comparing a second set of diagraph characteristics data with the first set of diagraph characteristics data; and
allowing access to a resource if the second set of diagraph characteristics data approximates the first set of diagraph characteristics data.

16. The computer-readable medium of claim 14, which when executed by the machine further causes the machine to perform operations comprising:
storing the second set of diagraph characteristics data within a resource.

17. The computer-readable medium of claim 14, wherein the resource is an encoded message.

18. A method performed by a processing device comprising:
tracking a first set of computer system input source key activation and release timing data for at least one user typing on an alpha-numeric keyboard;
storing in the computer system at least one biometric keystroke user identification template derived from the first set of input timing data;
tracking a second set of computer system input source key activation and release timing data for the at least one user typing on an alpha-numeric keyboard;
comparing the second set of input timing data with the at least one biometric keystroke user identification template, wherein the first set and second set of input source key activation and release timing data: (1) are associated with a first diagraph defined by a common sequence of letters that occur during typing of separate letters of the first diagraph and (2) depend on a typing characteristic of a user, wherein the first set of input timing data comprises a first time interval that a first key of the first diagraph is active, a second time interval between deactivation of the first key and activation of a second key of the first diagraph, and a third time interval that a second key of the first diagraph is active, wherein deriving the user identification template comprises calculating a template interval mean using the first, second, and third time interval to measure the proximity of the first, second, and third time interval with a plurality of previously tracked first, second, and third time intervals.

19. The method of claim 18, further comprising generating the at least one template comprising calculating a template interval mean (TIM) or calculating a Euclidian Distance using the first set of input timing data for the first diagraph.

20. The method of claim 18, wherein the first set of input timing data comprise data from a plurality of documents known to be from a first user, and further comprising comparing the template to the second set of input timing data to determine if the second set of input timing data originated from the first user.

21. The method of claim 20, further comprising storing a plurality of templates in a storage system, where each template is representative of a given user.

22. The method of claim 21, further comprising comparing the second set of input timing data to the plurality of templates to identify a user who provided the second set of input timing data.

23. The method of claim 21, further comprising receiving a claim that the second set of input timing data is from a given user, and determining if the sample is from the given user by comparing it to the plurality of templates.

24. The method of claim 18 wherein the first and second set of timing data are for inputting the first diagraph and a second diagraph of an uninterrupted typing pattern input from an alpha-numeric keyboard, and include key activation and release timing for each of at least two keys of each of the first diagraph and the second diagraph.

25. The method of claim 24 further comprising rejecting the template if the first set of timing data does not include a sufficient number of diagraphs.

26. The method of claim 24 wherein the first set of timing data comprises a time interval between an input source key activation for the first diagraph and an input source key activation for the second diagraph.

27. The method of claim 26 wherein the template comprises a Euclidian Distance of the time interval between an input source key activation for the first diagraph and an input source key activation for the second diagraph.

* * * * *